United States Patent [19]

Ulrich et al.

[11] Patent Number: 4,581,061
[45] Date of Patent: Apr. 8, 1986

[54] METHOD FOR REDUCING OXIDIC IRON ORES IN A ROTARY KILN

[75] Inventors: Klaüs Ulrich, Heiligenhaus; Wilhelm Janssen, Mülheim, both of Fed. Rep. of Germany

[73] Assignee: Fried. Krupp Gesellschaft mit beschränkter Haftung, Essen, Fed. Rep. of Germany

[21] Appl. No.: 647,780

[22] Filed: Sep. 6, 1984

[30] Foreign Application Priority Data

Sep. 9, 1983 [DE] Fed. Rep. of Germany ....... 3332556

[51] Int. Cl.$^4$ ............................................. C21B 11/06
[52] U.S. Cl. ...................................................... 75/36
[58] Field of Search .............................................. 75/36

[56] References Cited

U.S. PATENT DOCUMENTS 3,486,883 12/1969 Heitmann ................................ 75/36
3,890,138 6/1975 Hockin .................................... 75/33

Primary Examiner—Melvyn J. Andrews
Attorney, Agent, or Firm—Spencer & Frank

[57] ABSTRACT

In a reduction process carried out in a rotary kiln in which oxygen-containing gases are introduced by way of nozzles and at least a part of the highly volatile solid reductants are introduced from the discharge end so as to be distributed over a substantial region of the kiln bed, and any remaining balance of the reductants is fed jointly with the ore and the additives at the feed end, the formation of fusion deposits is prevented by the introduction of at least 60% of the reductants via the discharge end, and that at least a 60% portion of the reductants includes no more than 20% of the total reductant particulates having less than a 3 mm particle size.

12 Claims, 1 Drawing Figure

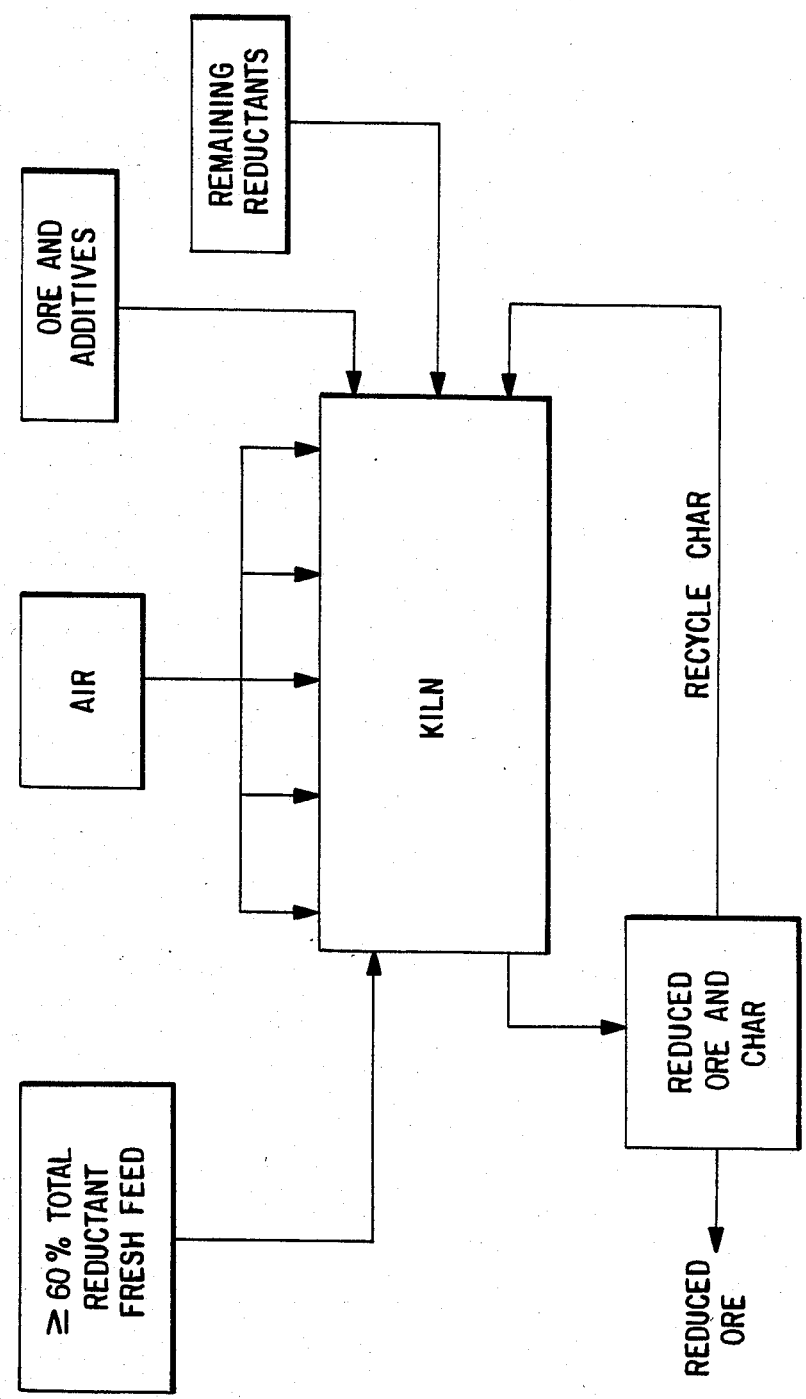

METHOD FOR REDUCING OXIDIC IRON ORES IN A ROTARY KILN

BACKGROUND OF THE INVENTION

The invention relates to a process for reducing oxidic iron ores using solid highly volatile reductants in a tubular rotary kiln in which oxygen-containing gas or oxygen is introduced at locations distributed throughout the length of the kiln, e.g., by way of appropriately distributed and regulated nozzles, wherein at least part of the reductants are introduced from the discharge end of the kiln and distributed over a substantial region of the kiln charge bed and any remaining reductants are introduced at the feed end of the kiln with the oxidic iron ores and additives.

In the known processes of this type, in which iron ores in lump or pellet form are reduced in a tubular rotary kiln to form sponge iron, a mixture of iron ore, coal, crude dolomite or limestone serving as a desulphurizing agent, and excess carbon recovered from the process (recycle char) are fed into the rotary kiln mounted at an incline. The mixture of solids is heated by hot kiln gases to a temperature above 900° C. to a maximum of 1240° C. Such a process is disclosed, for example, in U.S. Pat. No. 3,890,138.

In the known processes the energy required for heating the solids, the heat requirements for the endothermic reaction, and the make-up for lost heat are generated partly by the post-combustion of carbon monoxide which is formed by means of oxygen in air introduced at various locations over the length of the kiln.

It is typical in all such processes that the temperature difference between the hot gases in the open kiln space and the kiln charge amounts to 100°–150° C. over a major part of the kiln length. It is moreover typical for all direct reduction processes conducted in rotary kilns to have very little carbon monoxide liberated by the charge in the lower kiln region, where the reduction has already been substantially completed. The small amount of carbon monoxide liberated is not sufficient to keep the temperature in that region of the kiln sufficiently high for a final metallization of more than 90% (metallization=metallic iron content/total iron content). In those processes, the additional thermal energy required in the discharge region of the rotary kiln is provided by the combustion of oil, gas or coal.

The rate at which the reaction proceeds and, accordingly, the amount of sponge iron produced per unit of kiln volume increases as the temperature of the solid mixture in the kiln is increased. Accordingly, for purposes of economical operation, the temperature of this material is set as high as possible. However, in those processes in which a major proportion of the small sized highly volatile coal is blown into the kiln from the discharge end, operating breakdowns frequently occur due to the adherence of molten or caking solid particles to the inner kiln periphery. This deposit buildup can result in a substantial interference with the material flow in the kiln. In various commercial plants they have resulted in such reductions of the free kiln cross section that production had to be stopped in order to strip off deposits from the kiln.

SUMMARY OF THE INVENTION

There exists a need for a process for the reduction of oxidic iron ores using solid, highly volatile reductants in rotary kilns in which, despite heating with cheap bituminous coal introduced in a large part at the discharge end of the kiln to achieve greater than 90% metallization, the formation of deposits in the tubular rotary kiln is substantially avoided. This need is satisfied by the present invention.

In accordance with the invention, a process is provided wherein at least 60% of the total solid reductants, excluding the recycle char, are introduced at the discharge end of the kiln, and these discharge end solid reductants contain no more than 20% of the total solid reductant particles having particle sizes less than 3 mm.

According to a further aspect of the invention, a process as set forth above is provided wherein at least 60% of the solid reductants, excluding the recycle char, are introduced at the discharge end in two portions, a major portion substantially free of fines smaller than 3 mm which is distributed over the kiln length region above the lower 20% of the kiln length measured from the discharge end, and a minor portion containing sufficient fines of particle size less than 3 mm to make up with their heat of combustion, by immediate combustion, the thermal deficiency prevailing near the discharge end of the kiln. This minor portion is distributed over the lowermost 20% of the kiln length closest to the discharge end. The balance of the reductants, including the balance of the reductant fines, are introduced at the feed end as part of the kiln charge bed.

It was surprisingly found that the process according to the invention virtually completely avoided deposit formation, an advantage that is normally achieved only by heating the kiln entirely with gas, which as a rule substantially increases the cost of the process.

A further advantage of this process resides in the fact that highly volatile coals of various types, e.g., even brown coal, can be used. Highly volatile fuels that can be used in the process of the invention are those having a volatile content of at least 20% by weight. The volatile portions of the fuels are essentially hydrocarbons that are evolved on heating, which can be completely oxidized to $CO_2$ and $H_2O$ on burning.

BRIEF DESCRIPTION OF THE DRAWING

The drawing is a block diagram illustrating the process of the invention in which a kiln, having oxygen or oxygen containing gas introduced at locations distributed throughout the length of the kiln, has ore additives and a portion of the reductants introduced at the feed end along with recycle char, and at least 60% of the total solid reductants excluding recycle char introduced at the discharge end. After discharge from the kiln, the solids are separated into two fractions, reduced ore and char; the reduced ore is the product of the process, and the char is recycled to the feed end of the kiln.

DETAILED DESCRIPTION OF THE EMBODIMENTS

This invention relates to a process for the reduction of oxidic iron ores using highly volatile solid reductants having volatile contents of at least 20% by weight, preferably coal, in a tubular rotary kiln. Oxygen or oxygen-containing gas is introduced at locations distributed throughout the length of the kiln. The reductants are similarly distributed over a substantial area of the kiln charge bed by introducing a portion of the reductants at the discharge end of the kiln and introducing the remaining portion of reductants, if any, with the oxidic iron ore charge and additives at the feed end of the kiln.

In a preferred embodiment of the invention at least 60% of the solid reductants, not including the recycle char, are introduced at the discharge end of the kiln and contain no more than 20% of the total reductant particles having a particle size less than 3 mm.

In a most preferred embodiment, 70 to 85% of the reductants are introduced at the discharge end of the kiln and contain no more than 15% of the total reductant particles having a particle size of less than 3 mm.

According to the invention, the reductants introduced at the discharge end of the kiln are injected, for example by pneumatic or mechanical means, so that they become distributed over the lowermost 30 to 70% of the kiln length measured from its discharge end, preferably over the lowermost 50 to 60% of the kiln length.

In a further refinement of the invention, 30 to 50% of the reductants introduced at the discharge end of the kiln are distributed over no more than the lowermost 20% of the kiln length, this 30 to 50% portion of the discharge end reductants contains the total amount of reductant particles having a particle size of less than 3 mm which are to be introduced at the discharge end. The remaining 50 to 70% portion of the reductants introduced at the discharge end of the kiln have no particles of less than 3 mm particle size and are distributed over the lower part of the kiln above the lowermost 20% length as measured from the discharge end; that is, the 10 to 50% portion of the kiln length, preferably the 30 to 40% of the kiln length, lying above and adjacent to the lowermost 20%.

According to the invention, the usual thermal deficiency prevailing at the discharge end of the kiln, particularly the lowermost 20% of the kiln length, is eliminated by the combustion of the reductant fines having a particle size of less than 3 mm which are contained in that portion of the discharge end reductant feed that is distributed over the lowermost 20% of the kiln length.

The amounts of reductants referred to herein relate throughout to freshly added reductant, such as fresh coal, only. The recycled pyrolized reductant residue (recycle char) is not included.

The process according to the invention will be further explained with reference to the following working Example which was conducted in a large scale plant for sponge iron production. It was possible to demonstrate that deposit formation in conducting the process was avoided entirely. The kiln was of the type commercially available from Fried. Krupp GmbH, an example of which is in commercial operation at Dunswart Steel near Benoni, South Africa.

EXAMPLE 1

Coal having a volatile content of more that 25% was screened at 3 mm. The coarse coal fraction having particle sizes from 3–35 mm was charged with a pneumatic injection device from the discharge end into the kiln. The injection was carried out by regulating the injection airflow so that the coal was distributed uniformly over the region from about 20% to about 60% of the kiln length measured from the discharge end. The coal pyrolysis gases liberated on heating the coarse coal mixed with the charge were combusted by means of atmospheric oxygen introduced through nozzles. The post-combustion of these gaseous energy sources provided the predominant portion (about 85%) of the additional thermal energy required in the respective kiln regions which was not available from the post-combustion of carbon monoxide. The tubular rotary kiln had a shell diameter of 4.6 m and a length of 74 m.

A small portion of coal having particle sizes 0–35 mm, i.e., non-screened coal, was pneumatically injected through a second injection device into and spread over a region of 0–15 m distance from the discharge end, i.e., 0–20% of the kiln length. The combustion of the fine coal content, less than 3 mm, supplied the remaining approximately 15% of the required additional thermal energy.

The screened-off coal fines having particle sizes of less than 3 mm were fed with the remaining coal, i.e., the balance of the total reductants introduced jointly with the ore, the air, the desulphurizing agent and the recycle char at the feed end, i.e., the upper kiln end.

The specific parameters of the process according to the invention were determined as follows:

Altogether, the following amounts of material based on 1 ton of sponge iron produced were charged:

1.43 ton ore of 66% Fe having a particle size of 5–25 mm 0.048 ton crude dolomite having a particle size of 1–4 mm 0.12 ton recycle char having a particle size of 1.6–10 mm Of the total amount of coal of 0.593 ton/ton of sponge iron, the following amounts were fed with the ore, crude dolomite and recycle char:

0.157 ton coal/ton of sponge iron with a particle size of 0 to 35 mm

The amounts injected into the kiln from the discharge end were:

0.436 ton coal/ton sponge iron

This amount was composed of:

0.377 ton coal/ton sponge iron having particle sizes from 3–35 mm, and 0.059 ton coal/ton sponge iron having particles sizes of 0–3 mm.

The sponge iron produced had 92% metallization.

The coal, having a lower thermal value of 27 MJ/kg, had the following composition:

| | | |
|---|---|---|
| Solid carbon | 59.0% | of dried coal |
| Volatile components | 30.0% | of dried coal |
| Ash | 11.0% | of dried coal |
| Sulphur | 0.9% | included in volatile components |
| Water | 4.0% | before the coal is dried | and the following elemental analysis:

C: 74.8%
H: 4.6%
O: 7.7%
$N_2$: 1.0%
S: 0.9% the remainder being inert ash.

From the molar ratio of hydrogen to volatile carbonaceous components, it was calculated that the volatile hydrocarbons of the coal were present predominantly in the form of $CH_4$. Applying the known thermal value of $CH_4 = 35.8$ MJ/Nm$^3$, it is possible to derive approximately the following amount of heat from the combustion of the volatile components of this coal:

9.23 MJ/kg coal

From a thermal balance compiled for the rotary kiln plant operating with the above-mentioned amounts of charge material for producing sponge iron, the following specific energy requirements per ton of sponge iron produced were apparent:

| | |
|---|---|
| Covering the endothermal reduction reaction: | 6.50 GJ/ton |
| Heating the solids to about 1050° C. | 1.45 GJ/ton |
| Covering the carbon losses in the ash, in the dust of the flue gas and in the sponge iron: | 1.52 GJ/ton |
| Covering the heat loss in the flue gas: | 5.55 GJ/ton |
| Covering the heat loss by radiation of the rotary tube kiln: | 1.01 GJ/ton |
| | 16.03 GJ/ton |

For calculating the reaction heat required for the overall reaction by means of the known enthalpies for $Fe_2O_3$ and CO, the following equation applies:

$$Fe_2O_3 + 3C = 2Fe + 3CO + 469.47 \text{ kJ}$$

The heat of reaction for the post-combustion of 3 moles CO with gaseous oxygen may be calculated from the following equation:

$$3CO + 3/2\ O_2 = 3CO_2 - 846.46 \text{ kJ}$$

From this follows that per 2 moles Fe an energy excess of 378.99 kJ is available for heating the material and for covering losses. The corresponding excess per ton of sponge iron then amounts to 2.97 GJ/ton if any iron still in oxide form is bound as FeO and if, as stated above, sponge iron metallized to 92% is produced from an ore of 66% Fe.

This excess amount of heat of 2.97 GJ/ton of sponge iron, when bearing in mind the endothermal reduction reaction, is insufficient, as shown by the above-stated thermal balance, for covering the overall thermal requirements. The additional thermal energy which must therefore be made available is:

$$16.03 - (6.50 + 2.97) = 6.56 \text{ GJ/ton sponge iron}$$

Since this amount of heat is to be generated by the combustion of volatile components of the coal having the above-stated analysis with atmospheric oxygen and since when feeding 0.593 ton of coal/ton sponge iron, this combustion of the volatile components yields heat in an amount of $$0.593 \times 9.23 = 5.47 \text{ GJ/ton sponge iron,}$$

it is now merely necessary to generate the small difference of 1.09 GJ/ton sponge iron by the combustion of solid carbon.

On the basis of the practical experience that, in the case of the readily reactive coal employed, all particles smaller than 3 mm will be combusted completely, it will be necessary in the case of that particle range to introduce into the kiln only a further 59 kg coal/ton sponge iron. If this coal is pneumatically injected from the discharge end, this corresponds to a proportion of coal fines of particles sizes smaller than 3 mm of only 10.0% of the total injected coal.

It will be understood from the above description that the present invention is susceptible to various modifications, changes and adaptations which are intended to be comprehended within the meaning and range of equivalents of the invention within the bounds of the appended claims.

We claim:

1. An improved process for the reduction of oxidic iron ore in a tubular rotary kiln, said kiln having a feed end where the iron ore is introduced, a discharge end where the reduced iron ore is removed, and an oxygen distribution system by which oxygen or oxygen-containing gas is introduced at a multiplicity of locations distributed throughout the length of the kiln, the improvement being the reduction of the iron ore solely by means of highly volatile solid reductants without the buildup of deposits on the kiln walls, comprising; introducing at the discharge end of the kiln a portion of the highly volatile solid reductants which is at least 60% of the total solid reductants excluding recycle char, said portion containing no more than 20% of the total solid reductants excluding recycle char having a particle size of less than 3 mm, and introducing any remaining reductants at the feed end of the kiln along with oxidic iron ores, additives, and recycle char.

2. The process of claim 1, wherein 70 to 85% of the total solid reductants excluding recycle char are introduced into the kiln at the discharge end, said 70 to 85% of the solid reductants containing no more than 15% of the total solid reductants excluding recycle char having a particle size of less than 3 mm.

3. The process of claim 1, wherein the reductants introduced at the discharge end are distributed over the lowermost 30 to 70% of the kiln length measured from the discharge end.

4. The process of claim 3, wherein the reductants introduced at the discharge end are distributed over the lowermost 50 to 60% of the kiln length.

5. The process of claim 3, wherein a 30 to 50% portion of the reductants introduced at the discharge end contains all solid reductants having a particle size of less than 3 mm that are introduced at the discharge end and this 30 to 50% portion is distributed over no more than the lowermost 20% of the kiln length, the remaining portion of the reductants introduced at the discharge end being distributed over the 10 to 50% part of the kiln length which lies above and adjacent to the lowermost 20% of the kiln length as measured from the discharge end.

6. The process of claim 1, wherein the proportion of reductant introduced at the feed end generates sufficient heat by the combustion of its liberated volatile component to satisfy the energy requirements for drying, calcining and preheating the kiln charge.

7. The process of claim 1, wherein the solid reductants introduced at the discharge end are introduced in two portions, the major portion being substantially free from particles having a particle size smaller than 3 mm and being distributed over the kiln length in a region of from 20% upwards measured from the discharge end, and a minor portion being distributed over the lowermost 20% of the kiln length and containing a sufficient number of particles having a particle size smaller than 3 mm and having a combined heat of combustion sufficient to satisfy on immediate combustion the thermal deficiency in the lowermost 20% of the kiln length, the remaining reductants being introduced with the ore and additives at the feed end of the kiln.

8. The process of claim 1, wherein the reductants introduced at the feed end are introduced jointly with the oxidic iron ores and additives.

9. The process of claim 1, wherein the oxygen-containing gas or oxygen is introduced through nozzles in the kiln wall appropriately distributed and regulated over the length of the kiln.

10. The process of claim 7, wherein the major portion of solid reductants introduced at the discharge end comprises coal having a volatile content of at least 25% and a particle size of from 3 to 35 mm, all coal fines having particle sizes of less than 3 mm having been removed by screening, which is distributed uniformly over a region of kiln length extending from the level of the lowermost 20% to the level of the lowermost 60% measured from the discharge end, and wherein the minor portion of solid reductants introduced at the discharge end comprises coal having particle sizes of 0 to 35 mm which is spread over a region of the lowermost 20% of the kiln length, and the coal fines having particle sizes of less than 3 mm removed from the major portion being introduced with the remaining coal, the ore, the additives and recycle char at the feed end of the kiln.

11. The process according of claim 1, wherein the reduction of the oxidic iron ores results in at least 90% metallization.

12. The process of claim 1, wherein the highly volatile solid reductants have a volatile content of at least 20% by weight.

* * * * *